No. 815,029. PATENTED MAR. 13, 1906.
O. M. MOWAT.
COUNTERSINKING OR FACING MACHINE.
APPLICATION FILED FEB. 11, 1905.
4 SHEETS—SHEET 1.
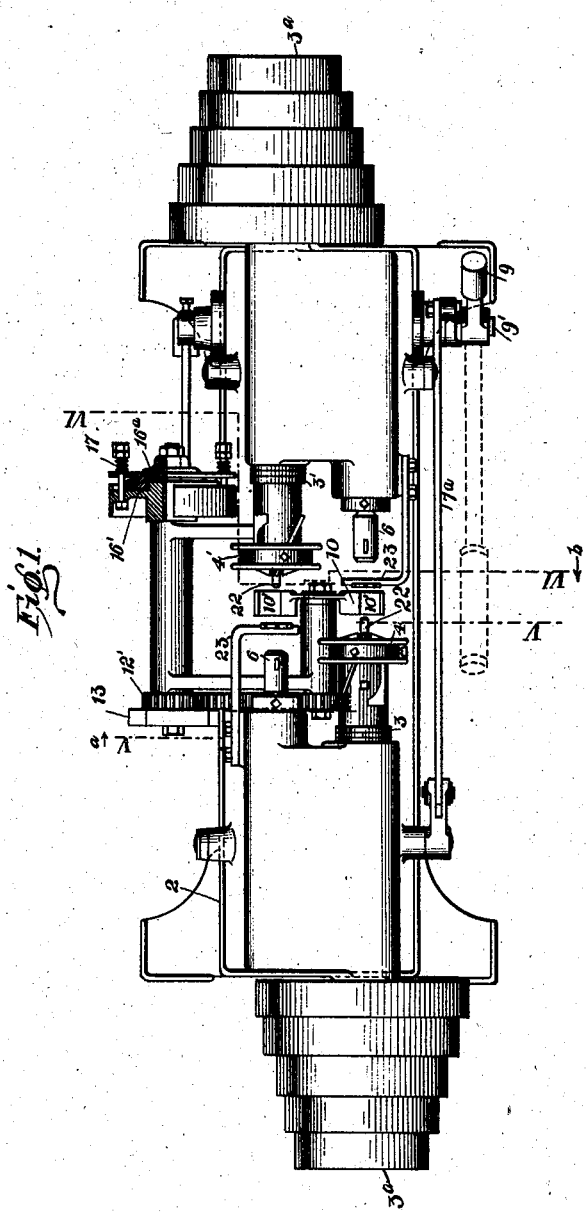
WITNESSES
INVENTOR No. 815,029. PATENTED MAR. 13, 1906.
O. M. MOWAT.
COUNTERSINKING OR FACING MACHINE.
APPLICATION FILED FEB. 11, 1905.
4 SHEETS—SHEET 2.
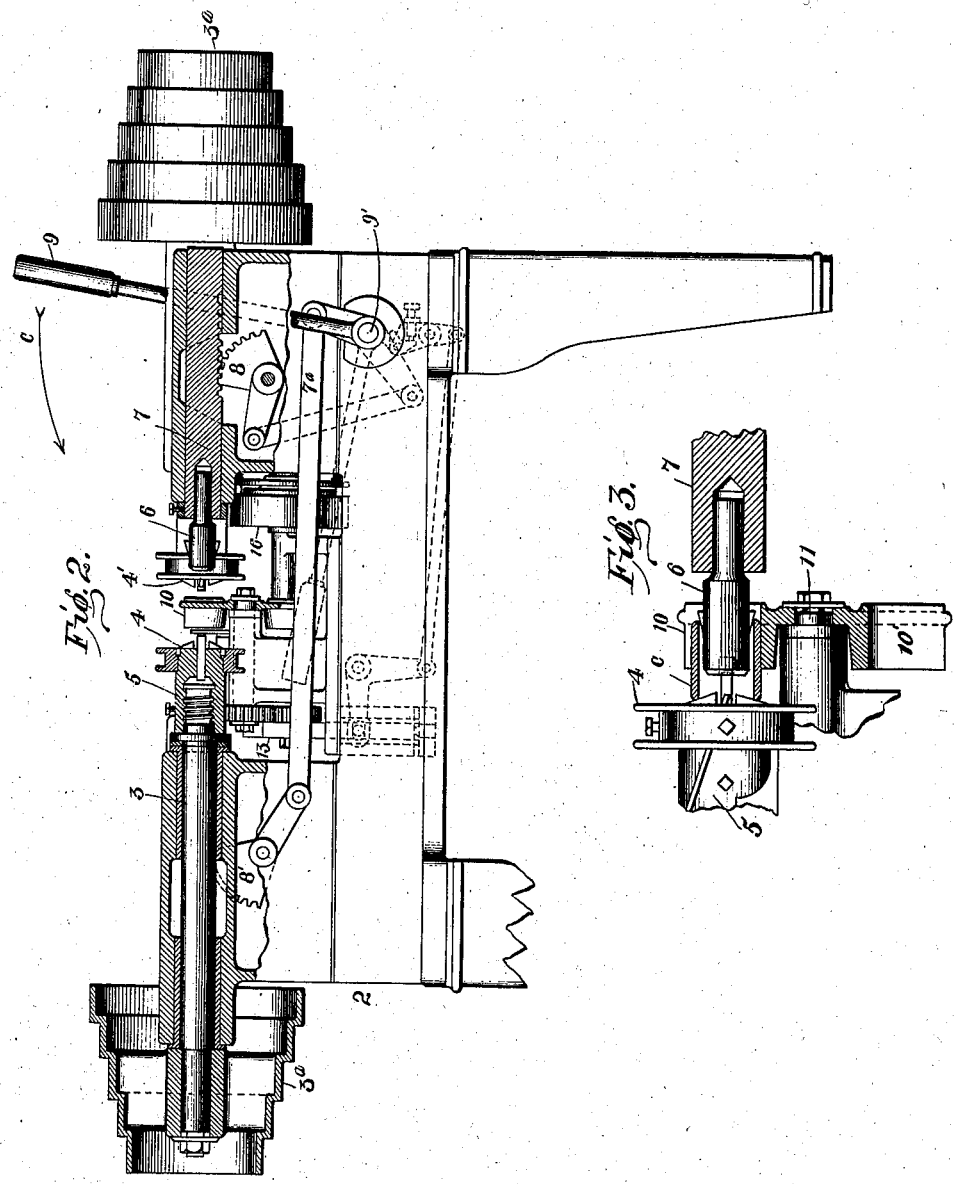
WITNESSES
INVENTOR No. 815,029. PATENTED MAR. 13, 1906.
O. M. MOWAT.
COUNTERSINKING OR FACING MACHINE.
APPLICATION FILED FEB. 11, 1905.
4 SHEETS—SHEET 3.
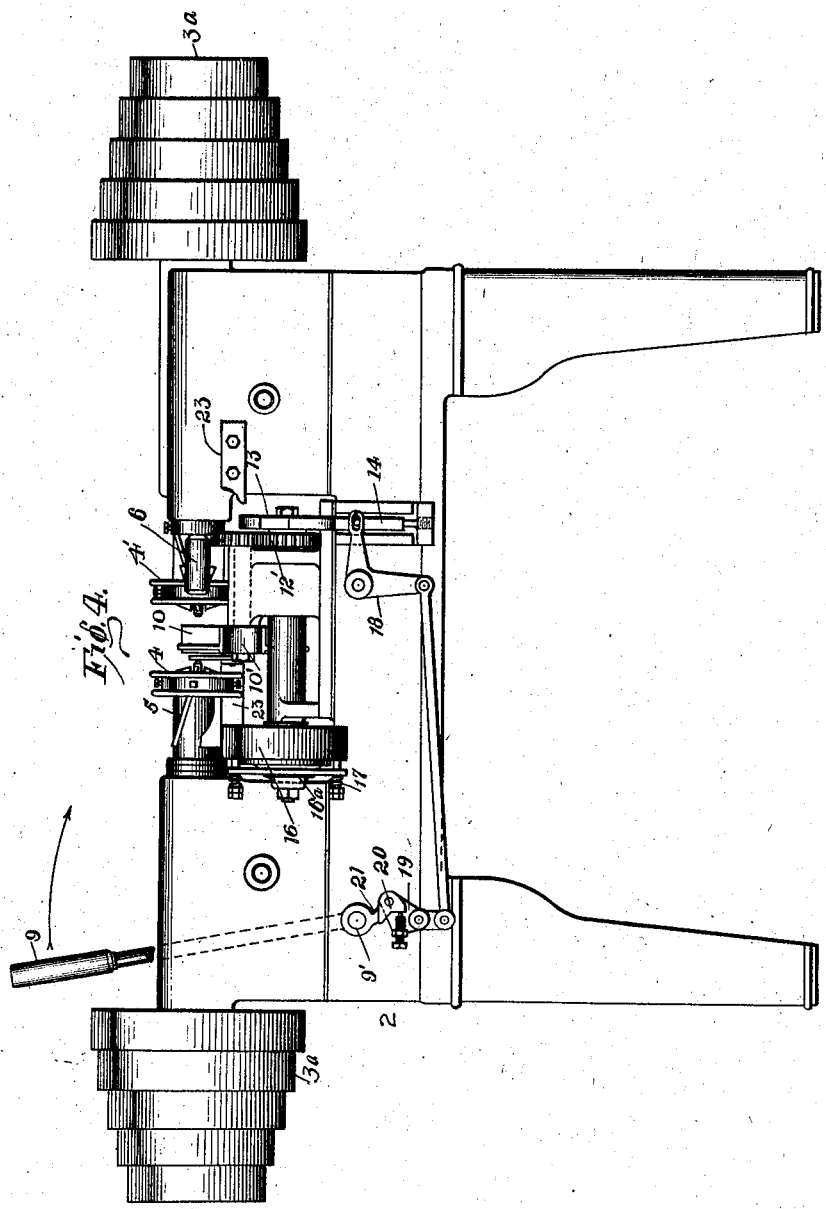

No. 815,029. PATENTED MAR. 13, 1906.
O. M. MOWAT.
COUNTERSINKING OR FACING MACHINE.
APPLICATION FILED FEB. 11, 1905.
4 SHEETS—SHEET 4.
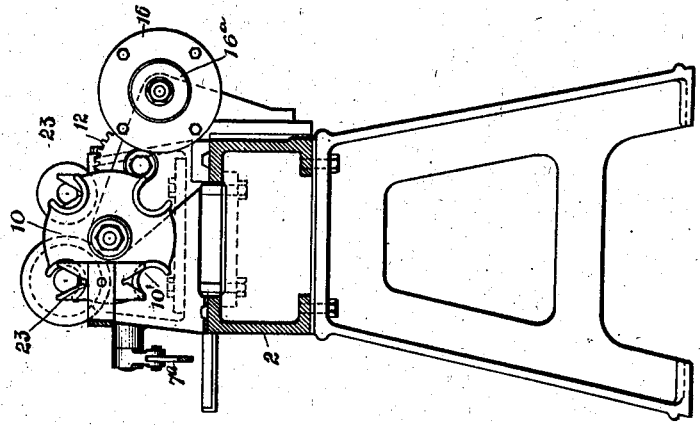
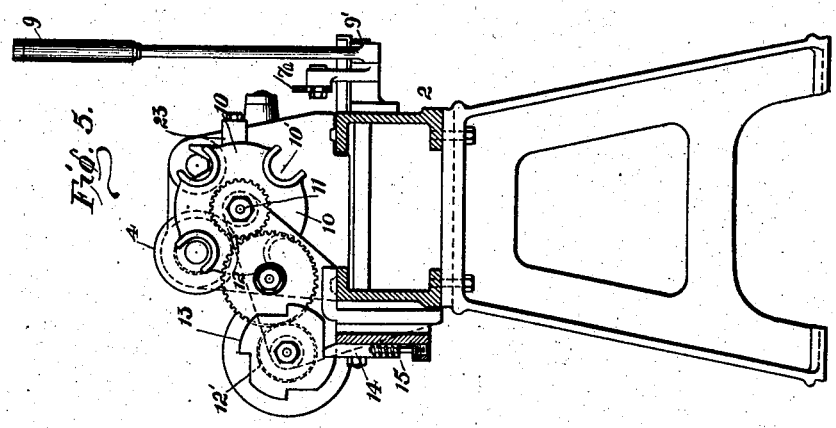
WITNESSES
R. D. Little
Warren W. Swartz
INVENTOR
O. M. Mowat
by Bakewell Byrn
his Attorneys

UNITED STATES PATENT OFFICE.

OLIVER M. MOWAT, OF McKEESPORT, PENNSYLVANIA, ASSIGNOR TO NATIONAL TUBE COMPANY, OF PITTSBURG, PENNSYLVANIA, A CORPORATION OF NEW JERSEY.

COUNTERSINKING OR FACING MACHINE.

No. 815,029.      Specification of Letters Patent.      Patented March 13, 1906.

Application filed February 11, 1905. Serial No. 245,265.

*To all whom it may concern:*

Be it known that I, OLIVER M. MOWAT, of McKeesport, Allegheny county, Pennsylvania, have invented a new and useful Countersinking or Facing Machine, of which the following is a full, clear, and exact description, reference being had to the accompanying drawings, forming part of this specification, in which—

Figure 1 is a plan view of the machine. Fig. 2 is an elevation partly in longitudinal section. Fig. 3 is a detail view, on a larger scale, showing the mandrel and countersinking or facing tool with a pipe-coupling C on the mandrel in position to be operated upon by the tool. Fig. 4 is an elevation of the side of the machine opposite to that at which the operator stands. Fig. 5 is a vertical cross-section on the line V V of Fig. 1 viewed in the direction of the arrow $a$, illustrating the manner in which the couplings to be countersunk or faced are carried to positions successively opposite to the mandrels and countersinking-tools by which the two ends of the coupling are successively treated; and Fig. 6 is a vertical cross-section on the line VI VI of Fig. 1 viewed in the direction of the arrow $b$.

It is necessary before threading pipe-couplings to face or countersink their ends in order to remove the fins or flashes which result from the shaping and welding operations to which they are subjected in the course of their manufacture, since such fins if not removed would injure the taps or interfere with their operation. My invention provides a machine by which such couplings can be countersunk or faced at both ends at one passage through the machine, so as to render it unnecessary, as heretofore, for the operator to insert the coupling into the machine, countersink one end thereof, then remove it, and insert it again for countersinking of the other end. The machine shortens the time required for this work, and thus obviates a large part of the expense of finishing the couplings. Moreover, by dispensing with repeated handling it enables the work to be done with less skill and care than have heretofore been required.

In the operation of the machine shown in the drawings the coupling to be countersunk or faced is placed in the machine in a suitable carrier, which carries it to the first working position, in which a mandrel is inserted in it, and it is brought into contact with a countersinking-tool, which revolves in contact with its end and countersinks or faces it. The coupling is then carried automatically to the second working position, in which it is entered again by a mandrel, and its other end is brought into contact with a second countersinking-tool. The next motion of the machine discharges the coupling which has thus been countersunk or faced at both ends. The operations above described take place successively, so that in the ordinary working of the machine there are two couplings which are being countersunk at respectively opposite ends, and each coupling before it leaves the machine and without the necessity of intervening handling by the operator is countersunk or faced at both ends.

The preferable construction of the machine is shown in the drawings and is as follows: 2 represents the frame of the machine provided with parallel shafts 3 3', carrying oppositely-facing countersinking or facing tools 4 4', which are screwed on threaded portions 5 at the ends of the shafts or are otherwise secured thereto. The countersinking-tools are adapted to face or countersink the couplings and to remove the fins therefrom, and as such tools are common in the art their construction does not form part of my invention and may be changed as desired. The shafts 3 3' are preferably driven continuously by belt-pulleys 3ª or otherwise. Opposite to the countersinking-tools are mandrels 6, fixed, respectively, to the ends of slides 7, provided with racks and segmental pinions 8 8' or other means by which they may be reciprocated toward and from their corresponding countersinking-tools. These mandrels are or may be of the construction ordinarily employed for the mandrels of countersinking-machines and are removable for purposes of repair or for the purpose of substituting mandrels of other sizes. The reciprocation of the slides 7 in opposite directions may be effected simultaneously by a hand-lever 9, the shaft of which is connected with the pinions 8 8' of each slide, as shown in Fig. 2.

Mounted between the countersinking-tools and mandrels is a carrier 10, which is preferably rotary, its axis 11 being so placed relatively to the countersinking-tools that the carrying-sockets 10' at its periphery will bring the couplings placed therein successively into line with the two sets of opposing countersinking - tools and mandrels. The carrier 10 is rotated by gearing 12, deriving its rotary motion from a pinion 12' on a shaft which also carries a four-step ratchet-stop 13, adapted to be stopped at the successive positions by a pawl 14, held in engagement with the ratchet by a spring 15. On the shaft of the pinion 12' is a friction-clutch 16, which is preferably belt-driven. The driving portion 16' of this clutch is held by springs 17 in frictional contact with the driven portion 16ª, which is keyed to the shaft of the pinion 12', so that as soon as the ratchet 13 is released by the pawl 14 this frictional contact will be sufficient to drive the pinion 12' and to move the carrier 10 to its next position, at which it is stopped by the pawl 14, and when it is thus stopped the part 16' will slip idly in contact with the other portion 16ª of the clutch. The pawl 14 is connected by a bell-crank lever 18 to a rock-arm 19, carrying a pivoted trigger 20, which is adapted to engage with a dog 21 on the shaft 9' of the lever 9 when the lever 9 is brought into such position as to retract the slides 7 7' and mandrels 6. At this time the engagement of the dog 21 with the trigger 20 momentarily rocks the arm 19, so as to retract the pawl 14 from the ratchet 13, and thus to release the ratchet and to permit the gearing 12 to rotate. This retraction of the pawl is only momentary, for the further motion of the lever 9 disengages the dog 21 from the trigger 20, thus permitting the spring to force the pawl 14 again into engagement with the ratchet and causing it to stop the same when it has completed its next quarter-revolution.

The operation of the machine is as follows: The shafts 3 3' having been started in rotation, so as to rotate the respective countersinking-tools 4 4', and the lever 9 having been moved into the position shown in Figs. 1, 2, and 4, so as to retract the slides 7 7' and mandrels 6 6' to their farthest extent, and a coupling being in each of the upper sockets 10, the operator moves the lever in the direction of the arrow c, Fig. 2, so as to advance the mandrels toward the center of the machine. These mandrels passing into the sockets 10' of the carrier enter the couplings which are placed therein, and then move the couplings forward into contact with the rotating countersinking-tools 4 4', the mandrels and tools being preferably centered by means of pins 22, which project centrally from the countersinking-tools and enter corresponding central holes in the mandrel. The parts are held in this position sufficiently long for each countersinking-tool to face the end of the coupling on which it is acting, and then the operator retracts the lever 9 into the position shown in Figs. 1, 2, and 4. This draws back the mandrels 6 6', retracts the couplings from contact with countersinking-tools, and leaves them in the sockets of the carrier, the mandrels being stripped from the couplings by strippers 23, having V-shaped ends in line with the mandrels and of sufficient diameter to permit the mandrels to be drawn through them, but to hold the couplings from being retracted by the mandrels back of the sockets of the carrier. As the lever approaches the end of its movement it momentarily retracts the pawl 14, thus releasing the ratchet 13, whereupon by means of the friction-clutch 16 the gearing 12 12' is rotated and the carrier 10 is advanced another step, which in the construction shown in the drawings equals a quarter-revolution of the carrier. This motion brings the coupling which has been acted upon by the tool 4 into line with the second tool 4', which is directed toward the opposite or unfaced end of the coupling, and brings a new coupling which has been placed by the operator in the carrier into line with the tool 4, so that the next motion of the lever 9 will bring the unfaced end of the first-named coupling into contact with the tool 4' and will bring one end of the new coupling into contact with the tool 4. The machine therefore successively faces the ends of each coupling without intermediate handling by the operator. Each operation of the machine finishes one coupling, faces one end of another coupling, and as the carrier is moved to bring the parts into a new position the finished coupling is discharged by dropping from the socket.

It will be observed that in the machine described the tools and carrier are in fixed longitudinal or endwise relation to each other and that the articles operated upon are moved in the carrier toward and away from the tools by means of the longitudinal mandrels. This arrangement not only avoids a longitudinal movement of the tool-operating shafts and tools while rotating, which complicates the bearings and driving-gear for the shafts, but it enables the tools to be constantly rotated in one direction, which very greatly increases the capacity of the machine.

The couplings may be held by gripping on their outer surface instead of as shown, and the parts may be modified in many ways within the scope of my invention, since

What I claim is—

1. A countersinking or facing machine having a plurality of tools, a carrier by means of which the articles to be operated upon are brought successively to the tools, said tools and carrier having a fixed relation to each other, and means by which the articles are engaged and moved endwise in the carrier toward and away from the tools.

2. In a machine of the character described, a plurality of tools, a carrier for bringing the articles to be operated upon successively to the tools, said tools and carrier having a fixed relation to each other, mandrels arranged to engage and move the articles in the carrier toward and away from the tools, and means for engaging said mandrels with the articles.

3. In a machine of the character described, oppositely-directed tools, a carrier intermediate of the tools for carrying the articles to be operated upon thereto, said carrier and tools having a fixed relation to each other, and devices for engaging and moving the work in the carrier endwise toward and away from the tools.

4. In a machine of the character described, oppositely-directed tools, a carrier intermediate the tools for bringing the articles to be operated upon successively thereto, reciprocable mandrels for moving the articles in the carrier toward and away from the tools, and means for reciprocating the mandrels simultaneously to move the articles on the carrier toward and away from the tools.

5. In a machine of the character described, oppositely-directed tools, a carrier intermediate of the tools for carrying the articles to be operated upon successively thereto, mandrels for engaging and moving the articles endwise on the carrier toward and away from the tools, and means for retracting the mandrels and thereupon advancing the carrier.

6. In a machine of the class described, the combination with oppositely-directed tools, of an intermediate rotary carrier, arranged to bring the articles to be operated upon successively to the said tools, and means for engaging and moving the articles endwise on said carrier toward and away from the tools.

7. In a machine of the character described, oppositely-directed tools, a rotary carrier intermediate of the tools and having sockets adapted to carry the articles to be operated upon successively into line with the tools, said tools and carrier being in fixed endwise or longitudinal relation to each other and means for moving the articles in the sockets into contact with the tools and away from the same.

8. In a machine of the class described, oppositely-arranged tools, a rotary carrier intermediate of the tools and having sockets arranged to carry the articles to be operated upon successively into line with the tools, reciprocable mandrels for moving the articles in said sockets endwise toward and away from the tools, and means for effecting an opposite simultaneous reciprocation of the said mandrels.

9. In a machine of the class described, oppositely-directed tools, a rotary carrier intermediate of the tools for bringing the articles to be operated upon successively in line therewith, oppositely-reciprocating mandrels for moving the articles in the carrier toward and away from the tools, and means for retracting the mandrels and thereupon advancing the carrier.

10. In a machine of the character described, a plurality of tools, a carrier for bringing the articles to be operated upon successively into line with the said tools, strippers opposite each tool, adjacent to the carrier, mandrels alined with each tool and projecting past the corresponding strippers for engaging the articles in the carrier and moving them toward and from the tools, and means for operating the mandrels.

11. In a machine of the character described, two oppositely-directed tools out of line with each other, a carrier intermediate the tools, for bringing the articles to be operated upon successively into line therewith, mandrels alined with the tools for engaging the articles on the carrier to move them toward and away from the tools, and operating means for the tools, carrier and mandrels.

12. In a machine of the character described, the combination of the oppositely-directed tools, the intermediate rotary carrier, said tools and carrier being fixed with respect to movement toward and away from each other, the manually-operated reciprocable mandrels, and means for simultaneously operating said mandrels in opposite directions.

13. In a machine of the character described, the combination with the oppositely-directed tools, the intermediate rotary carrier, and the oppositely-reciprocating mandrels, of gearing for actuating the said carrier, said gearing including a friction-clutch and means for actuating the said mandrels arranged to control the operation of said clutch.

14. In a machine of the character described, the combination with a plurality of tools, a rotary carrier, and reciprocating mandrels arranged to coöperate with the carrier in bringing the work to the tools, of gearing for operating said carrier including a friction-clutch, a stop for the said gearing, and means for actuating the said mandrels arranged to control the action of said stop and clutch.

15. In a machine of the character described, the combination with the rotary work-carrier and the reciprocating mandrels which coöperate with the said carrier, of an operating-lever for said mandrels, actuating connections between the lever and mandrels, intermittently-acting gearing for rotating the carrier, and means controlled by said lever for controlling the operation of the said gearing.

In testimony whereof I have hereunto set my hand.

OLIVER M. MOWAT.

Witnesses:
RICHARD D. JAMES,
A. A. COREY.